Aug. 28, 1962 G. C. BRATLAND ET AL 3,050,895
ANCHOR FOR DECOYS
Filed Nov. 21, 1960
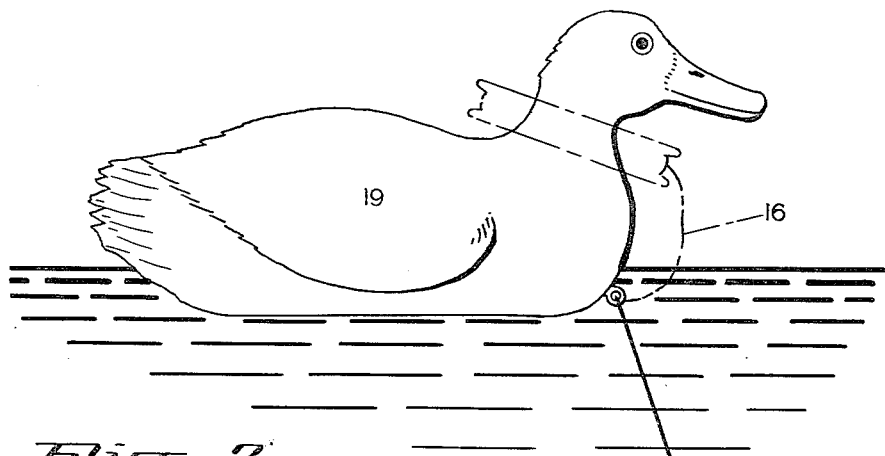
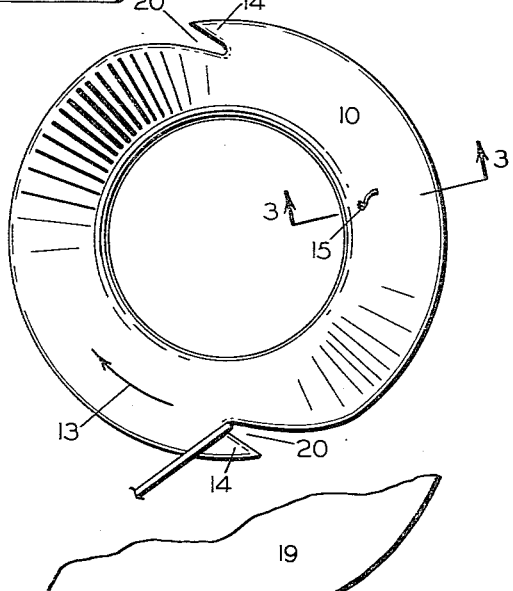
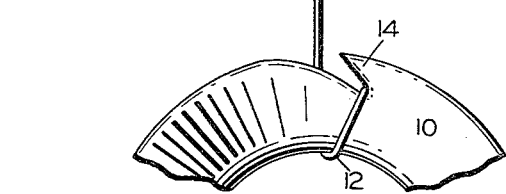
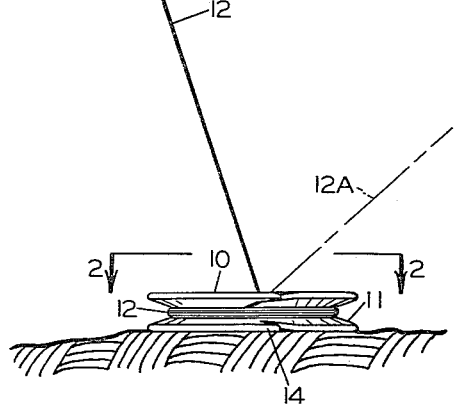
INVENTORS.
GUSTAVE C. BRATLAND
CHARLEY E. JOHNSON
BY
*Kimmel & Crowell*
ATTORNEYS

United States Patent Office 3,050,895
Patented Aug. 28, 1962

3,050,895
ANCHOR FOR DECOYS
Gustave C. Bratland, Box 103, Yamhill, Oreg., and Charley E. Johnson, 1333 Johnson St., McMinnville, Oreg.
Filed Nov. 21, 1960, Ser. No. 70,644
2 Claims. (Cl. 43—3)

This invention relates to an anchor for decoys when they are placed or set out so as to keep them from drifting away from the desired location.

Until the present invention, there have been many devices designed to serve as an anchor for decoys, none of which have been entirely satisfactory for one or more reasons. Therefore, this invention was designed to overcome the disadvantages of the pre-existing decoy anchors.

An object of this invention is to prevent decoy anchoring lines from drifting and thus becoming entangled with any under-water brush or debris because the line is too long for the depth of the water at any given point.

Another object of this invention is to provide a decoy anchor device that will only feed out the necessary amount of line to maintain the decoy substantially directly overhead of the anchor.

Another object of this invention is to provide an anchor that will not feed out line when it rests on the water bottom and the decoy is floating on the water surface.

Yet another object of this invention is the provision of an anchor device that may easily be stored when not in use.

Other objects and advantages reside in the details of construction and operation as more fully hereinafter described and claimed, reference being made to the accompanying drawings forming a part thereof, wherein like numerals refer to like parts throughout, and in which:

FIGURE 1 is a side view of the decoy.

FIGURE 2 is a plan view of the anchor line spool taken along line 2—2 of FIG. 1.

FIGURE 3 is a view partly in cross-section taken along line 3—3 of FIG. 2.

FIGURE 4 is an enlarged view of a method of storing the decoy when not in use.

Referring to the drawings, the invention consists of a circular bodied spool 10, the outer edge of which is formed into a V-shaped recess 11 that extends around the outer circumferential periphery of the device in which anchoring line 12 is wound and unwound as shown in FIG. 3. The direction in which the line 12 is unwound is indicated by arrow 13 in FIG. 2. The direction that the line 12 is wound within the V-shaped recess 11 is important since the device will not function if the line 12 is wound in the wrong direction. The winding and unwinding direction of line 12 is dictated by the direction of the cut or recess 20 within the line catching protrusions 14. It is the purpose of protrusions 14 to catch the line 12 and force it into recess 20 when the device is lying on its side on the water bottom, the result of which is to maintain sufficient tension on the decoy so that the line 12 will not unwind from spool 10.

When line 12 is properly wound about spool 10, as it lies on its side, anchoring line 12 cannot escape the protrusion 14 irrespective of the angle that the line is moved to, as illustrated by the anchoring line 12a, indicated by a broken line in FIG. 1. Before the anchor line is wound about spool 10, it is, of course, secured to the spool 10 by a suitable means 15, which is accomplished by merely tying line 12 through a hole provided within spool 10, or tying the line 12 taut circumferentially within the V recess 11.

In operation, the decoy is set in a desired location and the anchor is allowed to fall in the water where it continues to fall straight downward until it reaches the bottom of the body of water and lies one side or the other, as shown in FIG. 1 and described above. The anchor spool 10 will hold the floating decoy 19 in its proper place, the result of which is that no loose or extra line 12 will be unwound to allow the decoy to drift, or the line 12 to become entangled in any underwater debris.

When the device is not in use and it is desirable to store it, such may easily be done without the anchoring line 12 becoming unwound and tangled. To accomplish this, one of several methods may be employed, but because of its construction, one of the two following methods appears to be particularly adapted for use on this device. It is desirable to have the inside hole of spool 10 larger than the head of decoy 19, so that it may be placed about the neck of the decoy 19, as shown by the broken line 16, in FIG. 1. When not in use, a second method for storing the device of this invention is accomplished by removably attaching anchor line 12 to the decoy 19 by a snap 17 which engages mounting eye 18 located on the decoy 19. By unsnapping the snap 17 from the eye 18 and passing the snap through the hole in anchor spool 10, at a point near one of the protuberances 14, the line 12 cannot become unwound, since said protuberance will not allow the anchoring line 12 to unwind any further, as illustrated by FIG. 4. Of course, the protuberance nearest the decoy will be used when the line 12 is fully wound within the anchor spool 10.

It is to be understood, however, that even though there is herein shown and described a preferred embodiment of the invention, the same is susceptible to certain changes fully comprehended by the spirit of the invention as herein described and the scope of the appended claims.

We claim:

1. An anchor for a fowl simulating decoy used in a body of water comprising an annular spool, said spool having portions defining a V-shaped circumferentially extending recess therein, a line having one end secured to said spool, wound in said V-shaped recess, aligned pairs of protrusions on said spool adjacent said V-shaped recess on opposite sides thereof, said protrusions having undercut portions defining a recess therein extending in the direction in which said line is unwound, said line adapted to unwind from the V-shaped recess in said spool during movement thereof to an anchoring position, said line engageable with one of said protrusions adjacent the V-shaped recess in said spool when the same is in an anchoring position, and said line movable into said recess in said protrusions to prevent further unwinding thereof.

2. An anchor as defined in claim 1 wherein said aligned pairs of protrusions are in diametrically opposed relation on said annular spool.

References Cited in the file of this patent

UNITED STATES PATENTS

| | | |
|---|---|---|
| 779,937 | Holt | Jan. 10, 1905 |
| 2,023,526 | Hoberg | Dec. 10, 1935 |
| 2,289,647 | Grossenbach | July 14, 1942 |
| 2,325,861 | Kreb | Aug. 3, 1943 |
| 2,422,870 | Willis | June 24, 1947 |
| 2,523,811 | Buehl | Sept. 26, 1950 |
| 2,555,815 | Rawlins et al. | June 5, 1951 |
| 2,603,429 | Jaworowski et al. | July 15, 1952 |
| 2,630,093 | Toal | Mar. 3, 1953 |
| 2,711,607 | Watson | June 28, 1955 |